United States Patent
Lönn

(10) Patent No.: US 7,908,113 B2
(45) Date of Patent: Mar. 15, 2011

(54) METHOD AND DEVICE FOR DETERMINATION OF ROLL ANGLE

(75) Inventor: Olof Lönn, Kristinehamn (SE)

(73) Assignee: BAE Systems Bofors AB, Karlskoga (SE)

( * ) Notice: Subject to any disclaimer, the term of this patent is extended or adjusted under 35 U.S.C. 154(b) by 570 days.

(21) Appl. No.: 11/741,063

(22) Filed: Apr. 27, 2007

(65) Prior Publication Data

US 2007/0239394 A1 Oct. 11, 2007

Related U.S. Application Data

(63) Continuation of application No. PCT/SE2005/001600, filed on Oct. 26, 2005.

(30) Foreign Application Priority Data

Oct. 28, 2004 (SE) ....................... 0402611

(51) Int. Cl.
*G01C 1/00* (2006.01)
*G01C 9/10* (2006.01)
(52) U.S. Cl. .................. 702/151; 356/475; 701/221
(58) Field of Classification Search ............... 702/65, 702/95, 127, 150, 151; 356/475; 701/18, 701/22, 38, 213; 341/20; 342/357.12; 73/178 R, 73/862.331
See application file for complete search history.

(56) References Cited

U.S. PATENT DOCUMENTS

| 4,542,870 | A | | 9/1985 | Howell |
| 4,790,493 | A | | 12/1988 | Schwarzkopf et al. |
| 5,347,361 | A | * | 9/1994 | Kay .............................. 356/475 |
| 5,886,257 | A | | 3/1999 | Gustafson et al. |
| 5,953,683 | A | | 9/1999 | Hansen et al. |
| 6,163,021 | A | | 12/2000 | Mickelson |
| 6,208,936 | B1 | | 3/2001 | Minor et al. |
| 6,285,954 | B1 | * | 9/2001 | Mark et al. .................... 701/221 |
| 6,727,843 | B1 | | 4/2004 | Hansen |

FOREIGN PATENT DOCUMENTS

RU 2218550 12/2003

* cited by examiner

*Primary Examiner* — John H Le
(74) *Attorney, Agent, or Firm* — Connolly Bove Lodge & Hutz LLP

(57) ABSTRACT

The invention relates to a method and device for the determination of the roll angle φ of a rotating body, such as a shell, utilizing sensors for the detection of rotation signals in a body-fixed coordinate system. According to the invention, a new filter device is proposed to handle moment interferences to which the body is subjected, for example, caused by wind turbulence in the atmosphere or similar phenomena. The interferences are eliminated by useful measurement signals emitted by the sensors being mixed down to the frequency zero and by the sensors' rotation signals thereafter being low-pass filtered.

13 Claims, 4 Drawing Sheets

METHOD AND DEVICE FOR DETERMINATION OF ROLL ANGLE

CROSS-REFERENCE TO RELATED APPLICATION

This application is a Continuation of PCT International Application PCT/SE2005/001600 filed on Oct. 26, 2005, which claims priority to SE0402611-8 filed on Oct. 28, 2004. The entire contents of each application are incorporated herein by reference.

TECHNICAL FIELD

The present invention relates to a method for determination of the roll angle $\phi$ of a rotating body such as a shell, utilizing sensors for detection of rotation signals in a body-fixed coordinate system, in which the body-fixed rotation signals emitted by the sensors are filtered. The invention also relates to a device for determination of the roll angle $\phi$ of a rotating body, such as a shell, comprising in the rotating body body-fixed sensors for detection of rotation signals in a body-fixed coordinate system, and a filter device for filtration of interference in the detected rotation signals.

BACKGROUND

A shell that moves in a ballistic path, see FIG. 2, will rotate the speed vector around an axis that lies in a horizontal plane. The rotation of the speed vector will take place around a plane-fixed y-axis $y_{PF}$. The plane-fixed coordinate system is defined in such a way that its origin follows the centre of gravity of the shell. The plane-fixed x-axis points forward in the shell along the axis of symmetry. The plane-fixed y-axis points to the right, viewed from the back, and lies in a plane that has the g-vector (g=gravitation) as a perpendicular. Finally, the plane-fixed z-axis points in such a way that the coordinate system has a right-hand rotation.

When rotation sensors are mounted in the shell, it is convenient to define a body-fixed coordinate system by the designation BF (Body Fixed), see FIG. 1. When the shell rotates around the axis of symmetry, an angle arises between the y-axis and z-axis of the plane-fixed coordinate system and the respective y-axis and z-axis of the body-fixed coordinate system. This angle is designated "$\phi$" in FIG. 1 and is called in the following the roll angle.

If three rotation-measuring sensors are mounted in the shell in such a way that they measure the rotation around respective body-fixed coordinate axes directly or via a linear combination, the inertial rotation vector can be expressed in the rotational directions $\omega_{xBF}$, $\omega_{yBF}$, $\omega_{zBF}$ of the body-fixed coordinate system.

The rotation around the plane-fixed y-axis can then be expressed as measurement signals from the body-fixed rotation sensor signals and the roll angle can thereafter be calculated.

$$\omega_{yBF} = \omega_{yPF} \cdot \cos(\phi)$$

$$\omega_{zBF} = -\omega_{yPF} \cdot \sin(\phi)$$

$$\phi = a\tan\left(\frac{-\omega_{zBF}}{\omega_{yBF}}\right)$$

However, the shell is acted upon not only by the g-vector but also by the atmosphere and, in particular, by wind turbulence in the atmosphere. This gives rise to moment interferences around the coordinate axes $y_{BF}$ and $z_{BF}$. This, in turn, gives rise to rotations in $\omega_{yBF}$ and $\omega_{zBF}$. These rotations can be greater by the power of 10 than the rotation $\omega_{yPF}$ caused by the effect of the g-vector on the path. In practice, therefore, the simple formula above can not be used to calculate the roll angle directly. In order to handle the body-fixed rotation sensor signals, the signals are therefore filtered. It has, however, proved difficult to filter effectively measurement signals that are non-linear. For example, linear filters of the Kalman type have proved to be difficult to use.

SUMMARY OF THE DISCLOSURE

The object of the present invention is to achieve a method and a device for the determination of roll angle that eliminates the rotation signal interferences caused by moment interferences that arise around the body's body-fixed coordinate axes $\omega_{yBF}$ and $\omega_{zBF}$ in a more effective and a simpler way. The object of the invention is achieved by a method characterized in that a useful measurement signal in the sensors' rotation signals is mixed down to zero in frequency and in that the rotation signals are thereafter low-pass filtered, and a device characterized in that the filter device comprises a mixer for mixing down a useful measurement signal in the sensors' rotation signals to zero in frequency and a low-pass filter for thereafter low-pass filtering the down-mixed rotation signals with useful measurement signal. By means of the invention, a method and a device for the determination of roll angle are achieved that estimate the roll angle in an effective way utilizing a smart non-linear filtration in a manageable low frequency range.

DETAILED DESCRIPTION OF THE VARIOUS EMBODIMENTS

The filter device advantageously comprises a phase-locking filter. In addition to a low-pass filter, the phase-locking filter can comprise sine- and cosine operators, multiplier and amplification regulator.

According to another advantageous embodiment, the filter device comprises a $\Delta\phi$-eliminator. By this means, a constant error $\Delta\phi$ in the roll angle can be eliminated.

In a suitable embodiment, the $\Delta\phi$-eliminator calculates $$y = LP\_\cos(\Delta\phi)*\sin(\phi+\Delta\phi) - LP\_\sin(\Delta\phi)*\cos(\phi+\Delta\phi)$$

$$x = LP\_\sin(\Delta\phi)*\sin(\phi+\Delta\phi) + LP\_\cos(\Delta\phi)*\cos(\phi+\Delta\phi)$$

and a tan(y/x) in order to obtain $\phi + W_1$, where $\phi$ is the roll angle, $\Delta\phi$ is a constant error in the roll angle, LP_ indicates that the next sine or cosine function is low-pass filtered and $W_1$ indicates the noise level of the output signal.

BRIEF DESCRIPTION OF THE SEVERAL DRAWINGS

The invention will be described below in greater detail with reference to the attached drawings, in which:

FIG. 1 shows definitions of coordinate axes and rotations.
FIG. 2 shows an example of a ballistic shell path.
FIG. 3 shows the frequency content of the measurement signals $\omega_{yBF}$, $\omega_{zBF}$ in an initial position.
FIG. 4 shows the frequency content of the measurement signals $\omega_{yBF}$, $\omega_{zBF}$ after down-mixing to zero in frequency.

Figure 1:
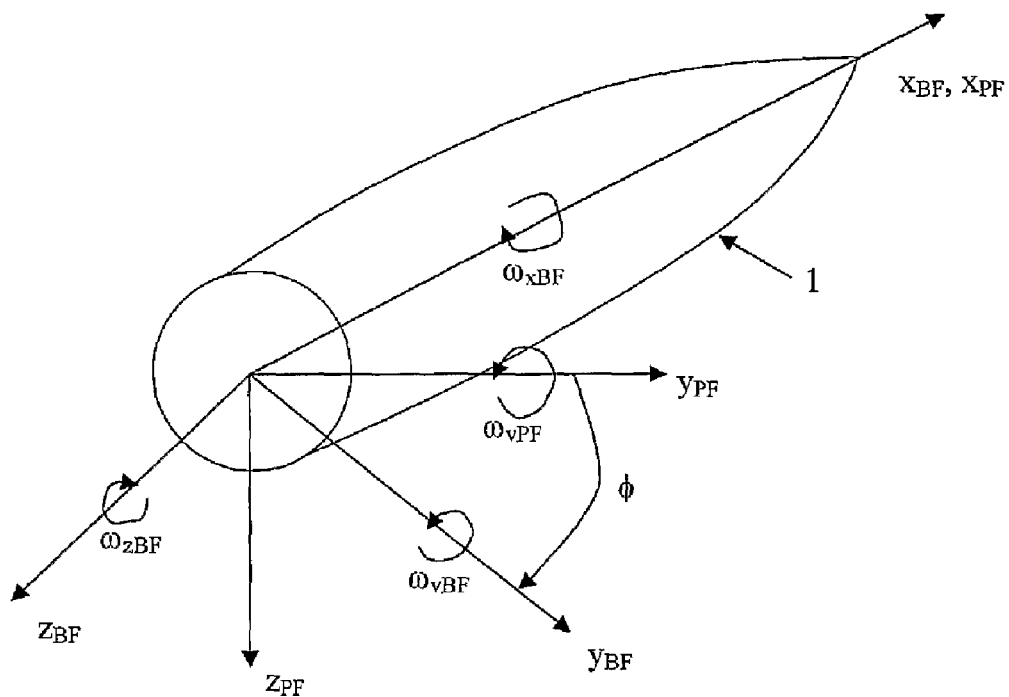
Figure 2:
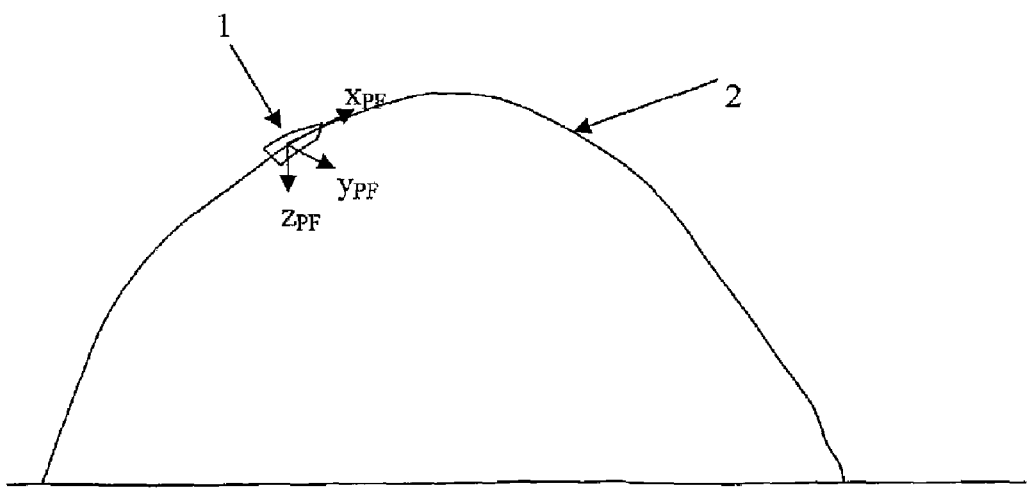

FIGS. 1 and 2 have already been discussed in the introduction to the description and there are therefore only some supplementary details to be discussed here. The shell shown in FIGS. 1 and 2 has been given the reference numeral 1 and follows a ballistic path 2.

Figure 3:
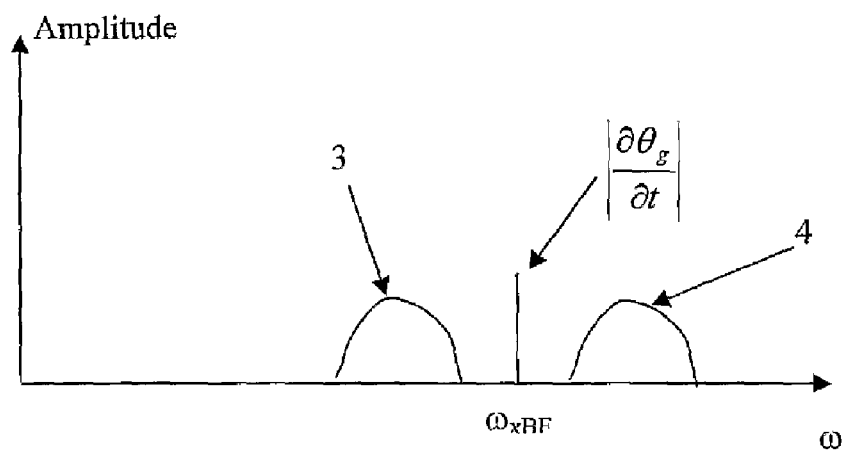
Figure 4:
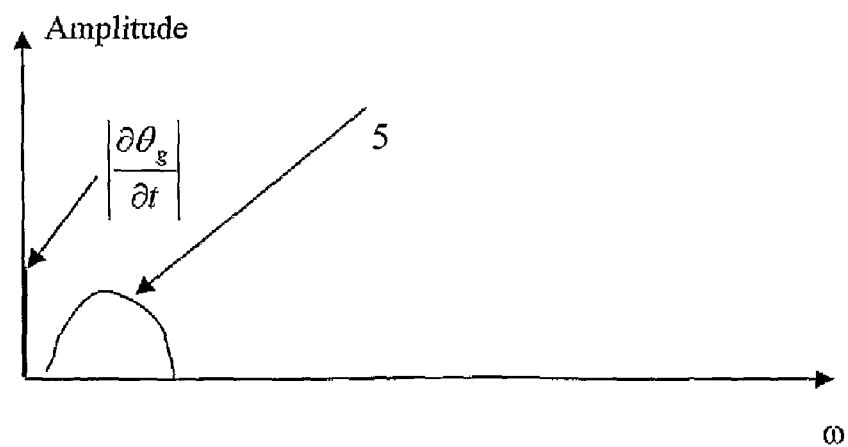

The function of the filter device is illustrated in FIGS. 3 and 4. The useful signal $$\left|\frac{\partial \theta_g}{\partial t}\right|$$

is originally at the frequency $\omega_{xBF}$ and is surrounded by interferences 3, 4 on each side of this frequency, see FIG. 3. After down-mixing, the useful signal $$\left|\frac{\partial \theta_g}{\partial t}\right|$$

is at the frequency zero and the interferences now designated 5 are now superimposed at somewhat higher frequencies than zero. The interferences 5 have now been brought to such a level as far as frequency is concerned that they can be filtered out by means of a low-pass filter.

Figure 7:
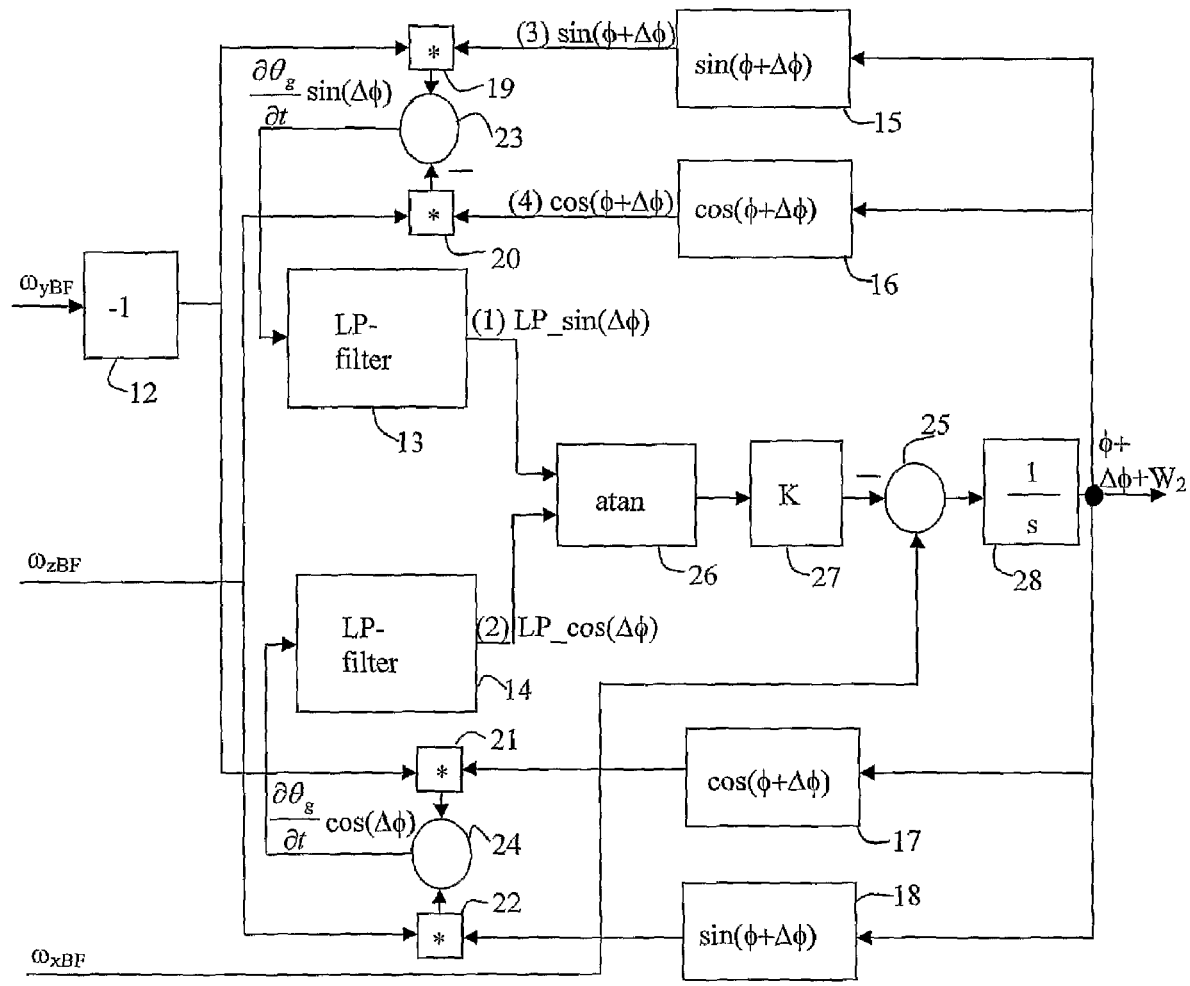
FIG. 7 shows a phase-locking filter comprised in the filter device according to FIG. 5.

The down-mixing of the useful signal can be described by the following two equations that are input signals to the lower and upper low-pass filter respectively, see FIG. 7.

$$LP_{in\_lower} = \frac{\partial \theta_g}{\partial t} \cdot \cos(\phi) \cdot \cos(\phi + \Delta\phi) + \frac{\partial \theta_g}{\partial t} \cdot \sin(\phi) \cdot \sin(\phi + \Delta\phi) = \frac{\partial \theta_g}{\partial t} \cdot \cos(\Delta\phi)$$

$$LP_{in\_upper} = \frac{\partial \theta_g}{\partial t} \cdot \cos(\phi) \cdot \sin(\phi + \Delta\phi) - \frac{\partial \theta_g}{\partial t} \cdot \sin(\phi) \cdot \cos(\phi + \Delta\phi) = \frac{\partial \theta_g}{\partial t} \cdot \sin(\Delta\phi)$$

The roll angle is designated ϕ and Δϕ is the constant error in the roll angle.

By dividing these two signals above and thereafter applying the inverse tangent function, the phase position error Δϕ is obtained. This error is amplified by a factor K and the result is a compensation term for $\omega_{xBF}$ that means that the filter homes in on zero in phase error irrespective of whether the error is positive or negative at the start of the filtering process. When there is a constant measurement error in the $\omega_{xBF}$-signal, it results in a constant phase error directly out from the phase-locking part of the filter. This constant phase error can be eliminated in a subsequent mathematical processing of the output signal by means of a Δϕ-eliminator.

Figure 5:
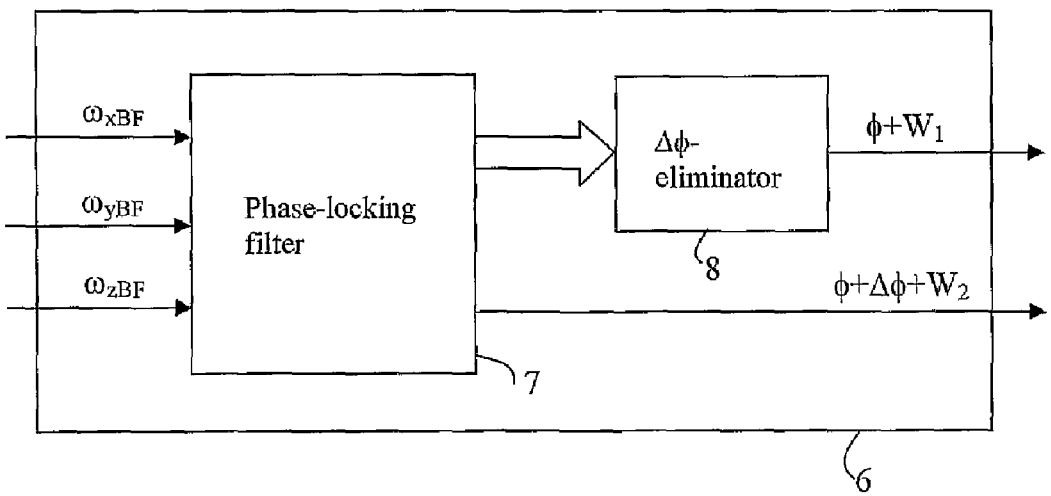
FIG. 5 shows a filter device comprised in the device according to the invention.
Figure 6:
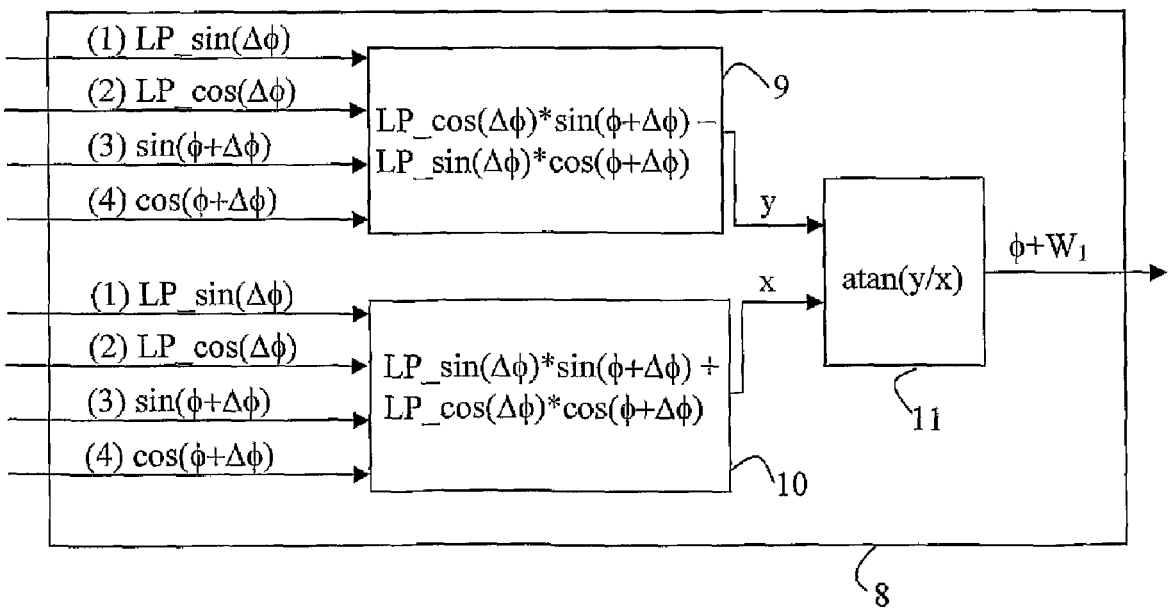
FIG. 6 shows an example of a Δϕ-eliminator that can be comprised in the filter device according to FIG. 5.

For a description of the function of the filter device with reference to FIGS. 5-7, block diagrams are used.

It can thus be noted that $$\frac{\partial \theta_g}{\partial t}$$

is negatively related to the $\omega_{yBF}$-axis $\omega_{zBF}$-axis, which means that the measurement signal for $\omega_{yBF}$ is to be given a minus sign and that the sign is positive for $\omega_{zBF}$.

The filter device 6 according to FIG. 5 comprises a phase-locking filter 7 and a Δϕ-eliminator 8. At the input of the filter device, there are three measurement signals emitted by sensors (not shown) that measure the rotation around the three body-fixed coordinate axes $\omega_{xBF}$, $\omega_{yBF}$, $\omega_{zBF}$. The filter device has also two output signals, of which the upper signal (ϕ+W$_1$) does not have any constant error term, but on the other hand the noise level W$_1$ is higher than for the lower output signal. The lower output signal contains a constant error Δϕ. This error arises when the sensor for $\omega_{xBF}$ has a constant error. The noise W$_2$ of the lower output signal is, however, lower than the upper output signal. Which output signal is selected is dependent upon which requirements with regard to noise and constant error are made for the estimated roll angle.

FIG. 6 shows the construction of the Δϕ-eliminator 8. In the Δϕ-eliminator there is a calculation unit that calculates:

$y = LP\_\cos(\Delta\phi)*\sin(\phi+\Delta\phi) - LP\_\sin(\Delta\phi)*\cos(\phi+\Delta\phi)$ $x = LP\_\sin(\Delta\phi)*\sin(\phi+\Delta\phi) + LP\_\cos(\Delta\phi)*\cos(\phi+\Delta\phi)$ and a tan(y/x) in order to obtain ϕ+W$_1$, The calculation unit can consist of a microprocessor that carries out mathematical operations shown in the blocks 9, 10 and 11. The input signals to the Δϕ-eliminator are obtained from the phase-locking filter 7 shown in FIG. 7, where (1), (2), (3) and (4) show where the signals are available.

The phase-locking filter 7 in FIG. 7 comprises the following blocks, namely a sign-changing block 12, two low-pass filters 13,14, sine- and cosine operators 15-18, multipliers 19-22, adders 23-25, inverse tangent function 26, amplifier 27 with amplification factor K and an integrating block 28.

The low-pass filters 13 and 14 that are shown in FIG. 7 are adapted for the application in question. If rapid homing-in by the filter device is required, the low-pass filters 13 and 14 are set as high as possible in frequency, but with the requirement that the total phase-locking filter is stable. If, on the other hand, small errors and low noise are required, the low-pass filters 13 and 14 are designed with narrow bandwidth and of high order, but with the requirement that the phase-locking filter is to be stable. The amplification of the phase-locking filter (speed) can be set by varying the amplification factor K. Normally, the amplification factor K should be adjusted when the low-pass filters 13 and 14 are adapted to the application in question.

The invention claimed is:

1. A method for determination of the roll angle ϕ of a rotating body comprising utilizing sensors for the detection of rotation signals in a body-fixed coordinate system, in which the body-fixed rotation signals emitted by the sensors are filtered, characterized in that rotation signals around the three body-fixed coordinate axes $\omega_{xBF}$, $\omega_{yBF}$, and $\omega_{zBF}$ are mixed down to zero in frequency and in that the rotation signals are thereafter low-pass filtered.

2. The method according to claim 1 wherein the rotating body is a shell.

3. A device for determination of the roll angle $\phi$ of a rotating body, comprising body-fixed sensors in the rotating body for detection of rotation signals in a body-fixed coordinate system, a filter device for filtration of interference in the detected rotation signals, characterized in that the filter device comprises a mixer for mixing down rotation signals around the three body-fixed coordinate axes $\omega_{xBF}$, $\omega_{yBF}$, and $\omega_{zBF}$ to zero in frequency and a low-pass filter for thereafter low-pass filtering the down-mixed rotation signals with useful measurement signal.

4. The device according to claim 3, characterized in that the filter device comprises a phase-locking filter.

5. The device according to claim 4, characterized in that the phase-locking filter further comprises sine- and cosine operators, a multiplier and an amplification regulator.

6. The device according to claim 5 wherein the rotating body is a shell.

7. The device according to claim 5, characterized in that the filter device comprises a $\phi$-eliminator.

8. The device according to claim 4, characterized in that the microprocessor is arranged to carry out requisite mathematical operations in the filter device.

9. The device according to claim 4, characterized in that the filter device comprises a $\Delta\phi$-eliminator.

10. The device according to claim 3, characterized in that a microprocessor is arranged to carry out requisite mathematical operations in the filter device.

11. The device according to claim 3, characterized in that the filter device comprises a $\Delta\phi$-eliminator.

12. The device according to claim 11, characterized in that $\Delta\phi$-eliminator is designed to calculate $$y = LP\_\cos(\Delta\phi)*\sin(\phi+\Delta\phi) - LP\_\sin(\Delta\phi)*\cos(\phi+\Delta\phi)$$

$$x = LP\_\sin(\Delta\phi)*\sin(\phi+\Delta\phi) + LP\_\cos(\Delta\phi)*\cos(\phi+\Delta\phi)$$
and a $\tan(y/x)$ in order to obtain $\phi+W_1$, where $\phi$ is the roll angle, $\phi+\Delta\phi$ is a constant error in the roll angle, LP_ indicates that the next sine or cosine function is low-pass filtered and $W_1$ indicates the noise level of the output signal.

13. The device according to claim 3 wherein the rotating body is a shell.

* * * * *